United States Patent [19]
Horiguchi

[11] Patent Number: 5,341,354
[45] Date of Patent: Aug. 23, 1994

[54] APPARATUS FOR RECORDING/REPRODUCING OPTICAL INFORMATION ON/FROM OPTICAL CARD

[75] Inventor: Toshio Horiguchi, Hachioji, Japan

[73] Assignee: Olympus Optical Co., Ltd., Tokyo, Japan

[21] Appl. No.: 706,864

[22] Filed: May 29, 1991

[30] Foreign Application Priority Data

May 31, 1990 [JP] Japan .................... 2-139842

[51] Int. Cl.$^5$ ................................. G11B 7/00
[52] U.S. Cl. ................ 369/44.11; 369/44.27; 369/58; 235/454
[58] Field of Search .......... 369/54, 44.11, 58, 44.27; 235/487, 494, 454, 380, 382, 462, 44.11, 58

[56] References Cited

U.S. PATENT DOCUMENTS

| | | | |
|---|---|---|---|
| 4,538,059 | 8/1985 | Rudland | 235/494 |
| 4,641,017 | 2/1987 | Lopata | 235/454 |
| 4,683,371 | 7/1987 | Drexler | 235/454 |
| 4,979,159 | 12/1990 | Tsuruoka et al. | 369/58 |
| 5,010,534 | 4/1991 | Enari et al. | 369/44.26 |

Primary Examiner—Aristotelis Psitos
Assistant Examiner—P. W. Huber
Attorney, Agent, or Firm—Stevens, Davis, Miller & Mosher

[57] ABSTRACT

An apparatus for recording/reproducing information on/from an optical card, in which a card identifying information data, which is recorded on the outside of a normal data recording portion of an optical card, can be reproduced by an optical head, a demodulating circuit and a focusing/tracking circuit, which are originally provided for recording/reproducing information on/from the normal data recording portion of the optical card. Therefore, in the apparatus according to the invention, it is unnecessary to specially provide the other apparatus for reproducing the card identifying information data, so that the apparatus as a whole can be made small and the cost therefor can be decreased.

2 Claims, 8 Drawing Sheets

FIG_1
PRIOR ART

FIG_8
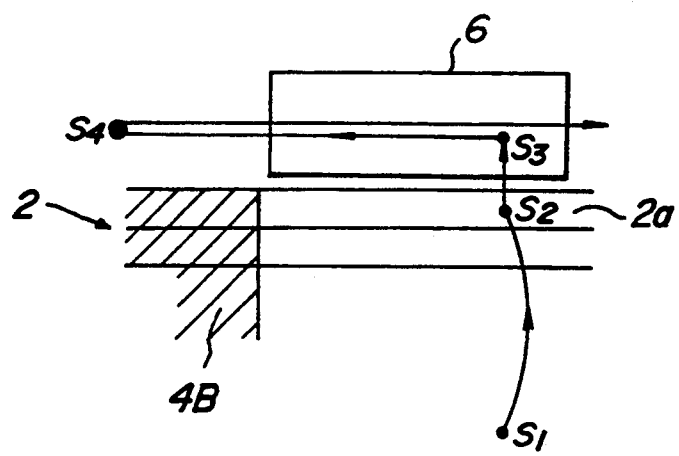
FIG_9
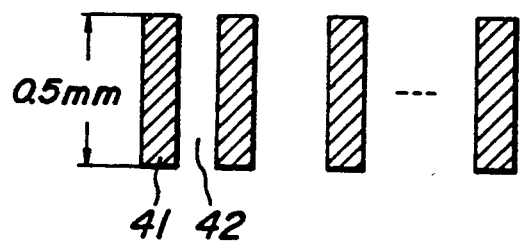

APPARATUS FOR RECORDING/REPRODUCING OPTICAL INFORMATION ON/FROM OPTICAL CARD

BACKGROUND OF THE INVENTION

1) Field of the Invention

The present invention relates to an apparatus for recording and/or reproducing information on and/or from an optical card and, more particularly, relates to an apparatus, in which not only information recorded on a normal data area formed on the optical card but also card identification information recorded on an area out of the normal data area can be reproduced without making the construction of the apparatus complex.

2) Prior Art

An optical card has a great memory capacity, which is several thousand to ten thousand times as large as a memory capacity of a magnet card. It is impossible to rewrite information data on the optical card as well as an optical disc, however, since the memory capacity of the optical card is great, i.e. about 1 to 2 mega bytes, the optical card is widely used in bankbooks, pocket maps, prepaid cards for shopping, etc.

Further, since it is impossible to rewrite information on the optical card, the optical card can be applied to personal health care cards, which should not have security against tampering with records.

Hitherto, many kinds of optical cards have been suggested; and the applicant has also suggested an optical card as shown in FIG. 1 in Japanese Patent Preliminary Publication No. 63-37876.

As shown in FIG. 1, on an optical card 11, is provided optical information recording area 13 which comprises a plurality of tracks 12. The tracks are extended in a longitudinal direction of the optical card 11, in parallel with each other. In the optical information recording area 13, there are provided track ID portions 14A and 14B at both end portions; and in the track ID portions, address information corresponding to each track 12 is recorded. Since the track ID portions 14A and 14B are arranged at both end portions of the optical information recording area 13, respectively, it is possible to read out track ID information from both sides of the optical card 11. Information data is recorded on a data portion 15, which is provided between track ID portions 14A and 14B. Therefore, when the optical card 11 is relatively moved from left side end to right side end in a track direction with respect to an optical head (hereinafter, the direction from left to right is called as "forward direction"), track address information recorded on the left side track ID portion 14A is read out by means of the optical head to identify address information corresponding to a relevant track. On the other hand, when the optical card 11 is moved from right side end to left side end (hereinafter, the direction from right to left is called as "rearward direction"), track address information recorded on the right side track ID portion 14B is read out by means of the optical head to identify the relevant track.

The track ID portions 14A and 14B are formed in the optical information recording portion 13 so as to be separated from both end portions of the optical card 11 by a given distance, for instance, 4 mm, inside therefrom, respectively. The reason why is that dust is apt to adhere on the end portions of the optical card 11 and flaws are apt to be formed thereon. In the optical card 11 show in FIG. 1, the track ID portions 14A and 14B are not affected by dust or flaws; additionally it is possible to make a relative moving speed of the optical card 11 and the optical head sufficiently stable during the period that the light beam generated from the optical head passes the outside of the track ID portions 14A and 14B. If the optical card 11 is constructed such that the distance between the track ID portions 14A and 14B and the respective end portions of the optical card 11, i.e. the outside of the track ID portions 14A and 14B, is short, it is possible to make the length of the data portion 15 long and then the memory capacity of the optical card 11 would increase; however, the relative moving speed of the optical card 11 and the optical head in the track direction would become slow and then an access time for recording/reproducing information data also would become slow. Therefore, in order to make the access time sufficiently fast and to increase the memory capacity of the optical card 11, it is necessary to accelerate the relative moving speed of the optical card 11 and the optical head sufficiently within the short outside portion of the track ID portion 14A (14B); to relatively move the optical card 11 with respect to the optical head at a constant speed in a stable manner from the left side ID portion 14A (right side ID portion 14B) to the right side ID portion 14B (left side ID portion 14A) via the data portion 15; and to suddenly decelerate the relative moving speed after the optical head has passed the right side ID portion 14B (left side ID portion 14A) to stop the optical card 11 within the short outside portion of the track ID portion 14B (14A).

FIG. 2 is a schematic view showing a whole construction of a conventional apparatus for recording/reproducing information on/from an optical card, in which the optical card 11 explained in the above can be used as an information recording medium. The apparatus is constructed such that the optical card 11 is reciprocally moved in the track direction and the optical head 21 is moved in a tracking direction, which is perpendicular to the track direction, to record/reproduce information data on/from the optical card 11.

The optical card 11 is mounted on a shuttle 24, which is arranged in a given position on a transfer belt 23, which is spread over between pulleys 22A and 22B. The shuttle 24 is reciprocally transferred in the track direction by driving a motor 26, under the control of a motor servo circuit 25. To the motor 26, is arranged a rotary encoder 27 to detect the position of the shuttle 24 with respect to the optical head 21. Controller 28 sends a command to the motor servo circuit 25 so as to make the transferring speed of the optical card 11 constant between the ID portions 14A and 14B on the basis of the positional information of the shuttle 24 detected by the rotary encoder 27.

An optical system arranged in the optical head 21 is constructed such that the so-called off-axial method is applied thereto. A light beam radiated from a laser diode 21A is made incident upon a collimator lens 21B, by which the diversed light beam is changed to a parallel light beam; the parallel light beam is separated into three light beams by a diffraction grating 21C; these three light beams are made incident upon an objective lens 21D being deviated from a center thereof; and then the three light beams are made incident upon the optical card 11. These three light beams are reflected by the optical card 11 and pass through the objective lens 21D again; and the progressive direction thereof is changed by 90 degrees by a mirror 21E; and then the light beams are focused on a photo detector 21G by a focusing lens 21F. The output of the photo detector 21G is supplied to a demodulating circuit 29 to obtain an information read out signal; and also supplied to a focus/track servo circuit 30 to detect a focus error signal and a tracking error signal.

The objective lens 21D is driven by actuators in a focusing direction and a tracking direction in such a manner that the light beam spots formed on the optical card 11 always trace the tracks in a focused condition on the basis of the focusing error signal and the tracking error signal.

The laser driving circuit 31, the motor servo circuit 25, demodulating circuit 29, focus/track servo circuit 30 and an optical head driving circuit 32 are controlled by the controller 28 in such a manner that when information data recorded on the tracks is reproduced, a light beam having a low power for reading out information data is generated from the laser diode 21A, and a desired track is sought on the basis of track address information thereof demodulated in the demodulating circuit 29; on the other hand, when information data is recorded on the optical card 11, a desired track is sought the as same as in the above procedure, and then a light beam having a high power for recording information data is generated from the laser diode 21A to record information data on the relevant track.

As stated above, since it is impossible to rewrite information data recorded on the optical card, the optical card would be put to practical use for recording personal information, for example, personal health care card and personal history record card. Almost all of the applications of the optical card would be related to private information and thus the protection therefor that data access from others is inhibited is important.

In order to carry out such protection, it is suggested that a cipher is recorded on the optical card like a banking cash card. However, if the cipher is recorded in the normal information recording/reproducing area, i.e. in the data portion 15 formed between the ID portions 14A and 14B, the cipher per se would be apt to be forged, and thus the security of the optical card would decrease. Therefore, card ID information for identifying the card per se, such as a cipher, is usually recorded on the outside of the optical information recording area 13 (normal data area) on the optical card 11.

Such card ID information data recorded on the outside of the normal data area cannot be read out with the aid of the conventional apparatus for recording/reproducing optical information explained in the above. In order to read out card ID information data it is necessary to provide another apparatus for reproducing card ID information data. However, if the other apparatus is provided, the apparatus for recording/reproducing as a whole would be complex and large, and further the cost for the apparatus would increase.

SUMMARY OF THE INVENTION

The present invention has for its object to provide an improved apparatus for recording/reproducing information on an optical card, by which not only information data recorded on the normal data recording area but also card ID information data recorded on the outside of the normal data recording area can be reproduced without making the apparatus large and without increasing the cost therefor.

In order to solve the object, the apparatus for recording/reproducing information on from an optical card by relatively moved an optical card with respect to a light beam according to the present invention, comprises:

an apparatus for recording and/or reproducing information data on/from an optical card, on which normal information data recording area and a card identifying information recording area are provided, by relatively moving an optical card with respect to light beams in a tracking direction; comprising:

information recording and/or reproducing means for recording and/or reproducing information data on/from said normal information data recording area formed on said optical card;

driving means for relatively moving said optical card with respect to said light beams in the track direction; and controlling means for controlling operations of said information recording and/or reproducing means and said driving means;

the apparatus being constructed such that card identifying information recorded on the card identifying information recording area, which is formed on the outside of said normal information data recording area, can be reproduced with the aid of said information reproducing means for reproducing information data recorded on said normal information data recording area, of said optical card.

As stated in the above, the apparatus according to the invention is constructed such that card ID information data recorded on the outside of the normal data recording area can be reproduced with the aid of the apparatus for reproducing information data recorded in the normal data recording area. Therefore, card ID information data recorded in the outside of the normal data recording area can be read out without making the apparatus large and without increasing the cost therefor.

BRIEF DESCRIPTION OF DRAWINGS

FIG. 8 is a schematic view illustrating a locus of a light beam when a card ID information recording area is sought; and FIG. 9 is a partial schematic view showing the card ID information area recorded on the optical card.

DETAILED DESCRIPTION OF THE PREFERRED EMBODIMENT

Figure 1:
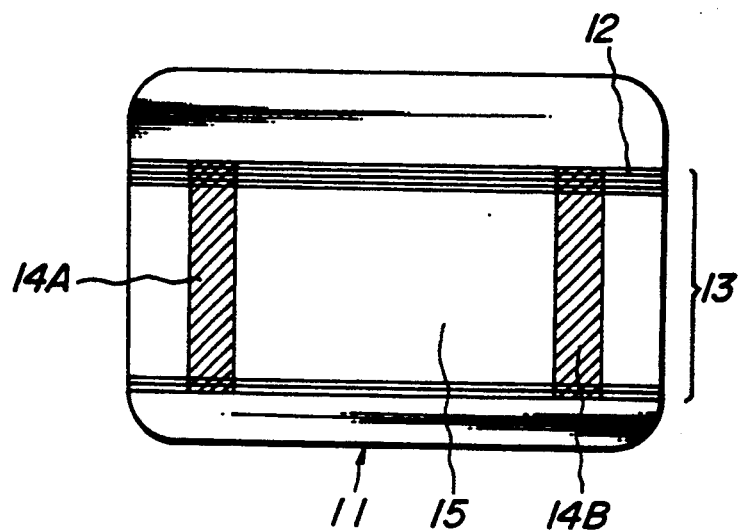
FIG. 1 is a schematic view showing an optical card, on which card ID information data is not recorded, for use in the conventional apparatus for recording/reproducing information on/from the optical card.
Figure 3:
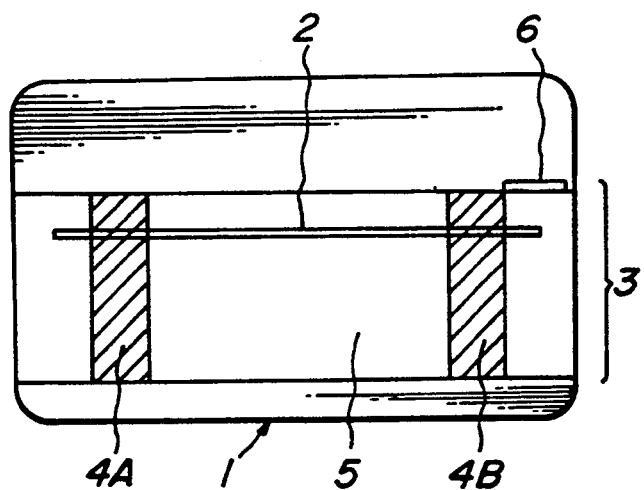
FIG. 3 is a schematic view illustrating an optical card, on which card ID information data is recorded.

FIG. 3 is a schematic view showing an optical card, which is used in the apparatus according to the invention. As well as the conventional optical card 11 shown in FIG. 1, on the optical card 1, is provided optical information recording area 3 which comprises a plurality of tracks 2, which are extended in a longitudinal direction of the optical card 1, in parallel with each other. In the optical information recording area 3, there are provided track ID portions 4A and 4B, at both end portions thereof; and in the track ID portions 4A and 4B address information corresponding to each track 2 is recorded. A data portion 5 is provided between the track ID portions 4A and 4B; on the data portion 5 there is recorded normal information data. Further to this, on the optical card 1, a card ID portion 6, in which card identifying information, i.e. a proper number for the card is prerecorded, is arranged above the upper portion of the uppermost track (see FIG. 8).

Figure 4:
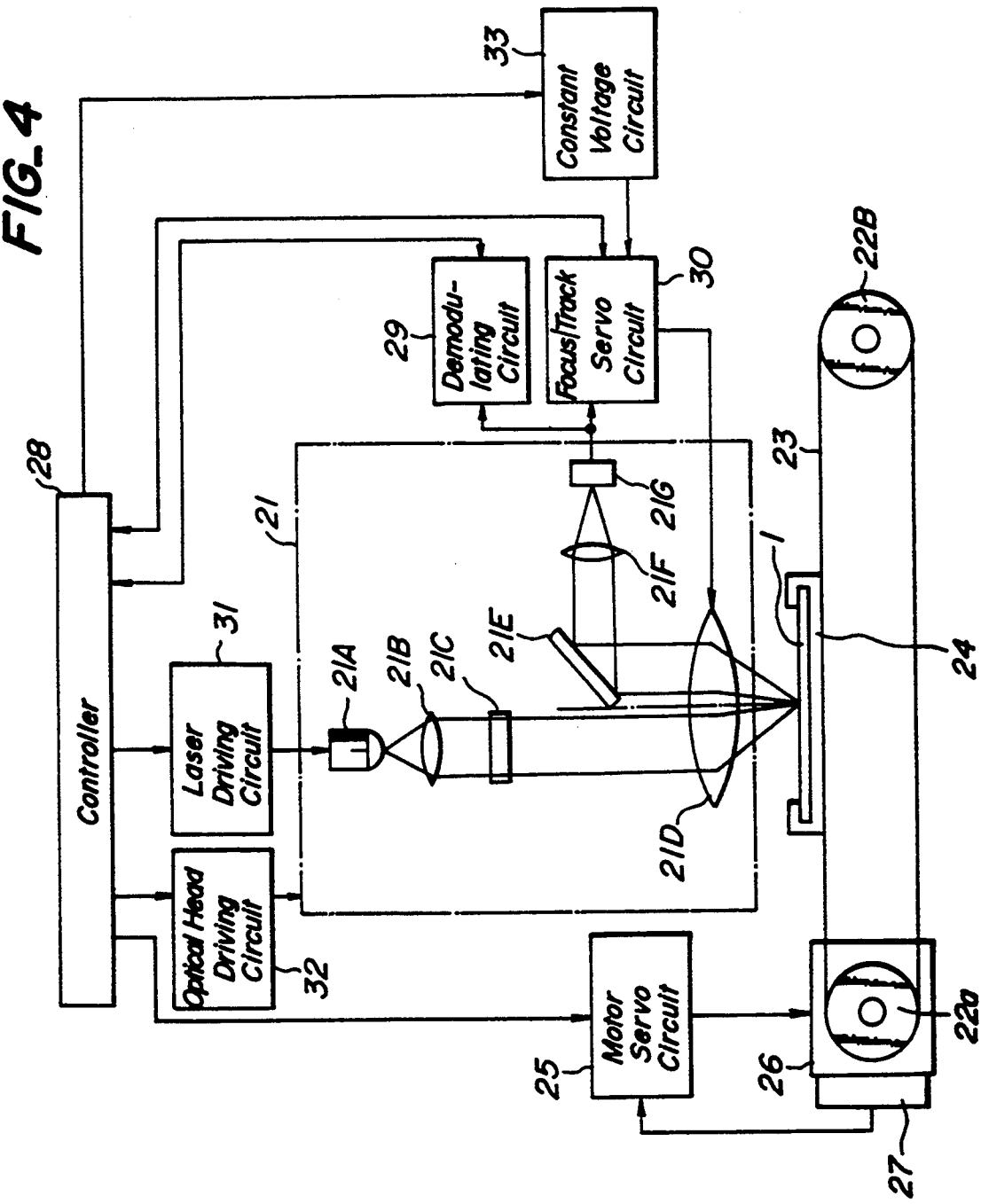
FIG. 4 is a schematic view representing a whole construction of the apparatus for recording/reproducing information on/from the optical card according to the invention.

FIG. 4 is a schematic view showing a whole construction of the apparatus according to the invention. In the apparatus according to the invention, card ID information data recorded on the card ID portion 6 is reproduced with the aid of the apparatus for reproducing information data recorded in the normal data portion 5. Since the main construction of the apparatus is almost the same as that of the conventional apparatus explained in FIG. 2, the same numerical numbers are applied to the same elements of the apparatus shown in FIG. 2 and the explanation therefor is omitted.

Figure 2:
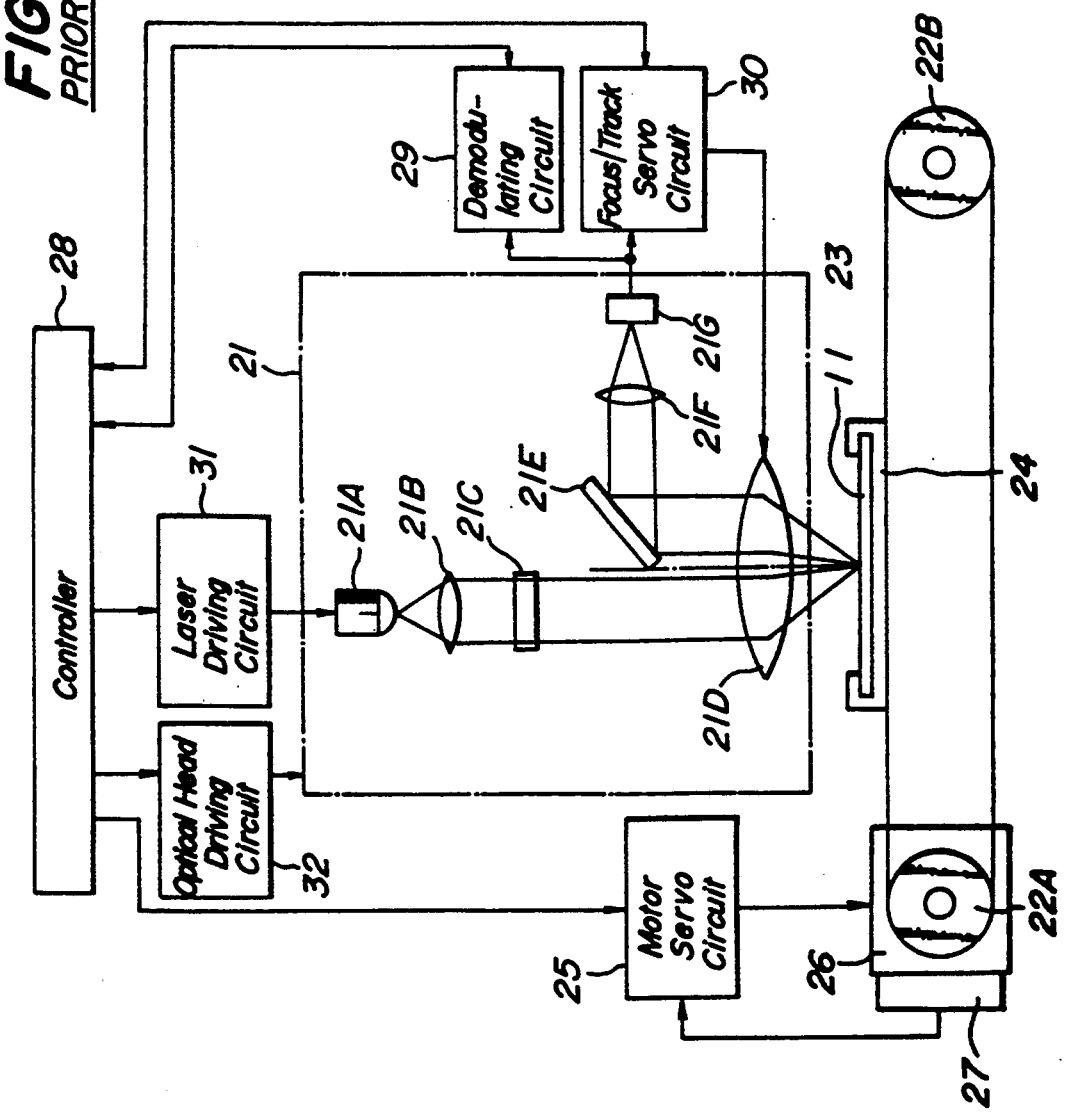
FIG. 2 is a schematic view depicting a whole construction of the convention apparatus for recording/reproducing information on/from the optical card.

As shown in FIG. 4, in the apparatus according to the present invention, a constant voltage circuit 33 is provided in addition to the elements of the conventional apparatus shown in FIG. 2. The constant voltage circuit 33 is driven under the control of the controller 28 to apply a constant voltage to a tracking actuator for driving the objective lens 21D in the tracking direction in order to read out card ID information data recorded on the card ID portion 6.

Figure 5:
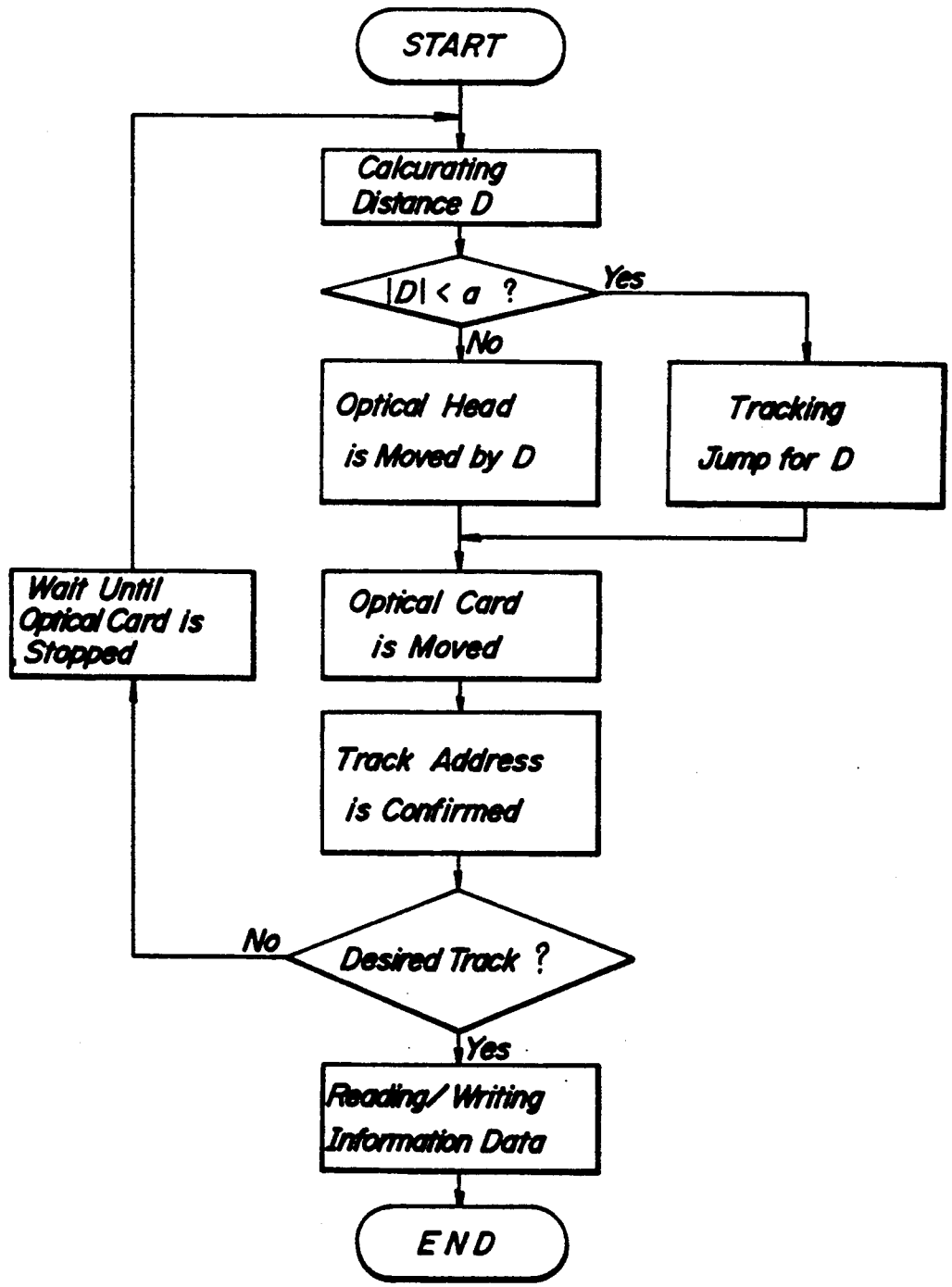
FIG. 5 is a flow chart showing an access movement of the apparatus according to the invention.

First, an access movement for recording/reproducing information data on/from the normal data portion 5 will be explained in the following, referring to the flow chart shown in FIG. 5 and the locus in FIG. 6.

Figure 6:
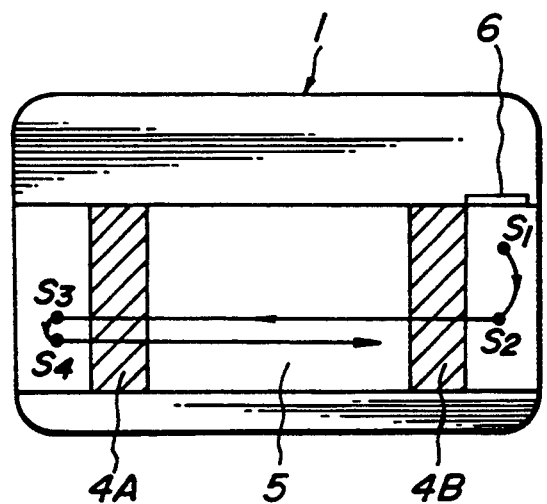
FIG. 6 is a schematic view depicting a locus of a light beam on an optical card when a desired track is sought.

In FIG. 6, it is assumed that the optical card 1 is stopped; the light beam spot for recording/reproducing information is positioned at S1 (home position); and the track address of the home position S1 is known. As shown in the flow chart in FIG. 5, in the controller 28, a distance D between the desired track and the home position is calculated and whether the absolute value D is smaller or not than the predetermined value a is judged. When the absolute value D is smaller than a, the track jump for the difference D between the desired track and the home position is repeated to seek the desired track; and when the absolute value D is larger than a, the optical head 21 as a whole is moved in the tracking direction by the distance corresponding to the distance D by driving the optical head driving circuit 32 to seek the desired track. Just after the coarse access movement has been finished the light beam spot comes to a position S2.

Next, the optical card 1 is moved in the forward direction to read out the address of the relevant track recorded in the right side ID portion 4A; and then confirm the address of the relevant track. In the case that the read out track address is corresponding with the desired track address, reading/writing operation is continued; but in the case that the read out track address is not corresponding with the desired track address, the optical card 1 is further moved in the forward direction upto the point S3 via the ID portion 4B. Thereafter, the difference D between the desired track address and the present track address is calculated again to access the desired track. In this case, since the position S3 at which the light beam spot is positioned is in the vicinity of the desired track, the distance D becomes smaller than a. Therefore, the light beam spot is moved to the position S4 by track jump for the distance D. Then, the optical card 1 is moved in the rearward direction and the relevant track address is confirmed by reading out information data recorded on the right side track ID portion 4A. In the case that the read out track address is corresponding with the desired track address, the operation for reading/reproducing information data is continued. In the case that the read out track address is corresponding with the desired track address, the operation for reading/reproducing information data is continued. In the case that the read out track address is not corresponding with the desired track address, the optical card 1 is stopped, and then the distance D is calculated again to confirm the track address.

Figure 7:
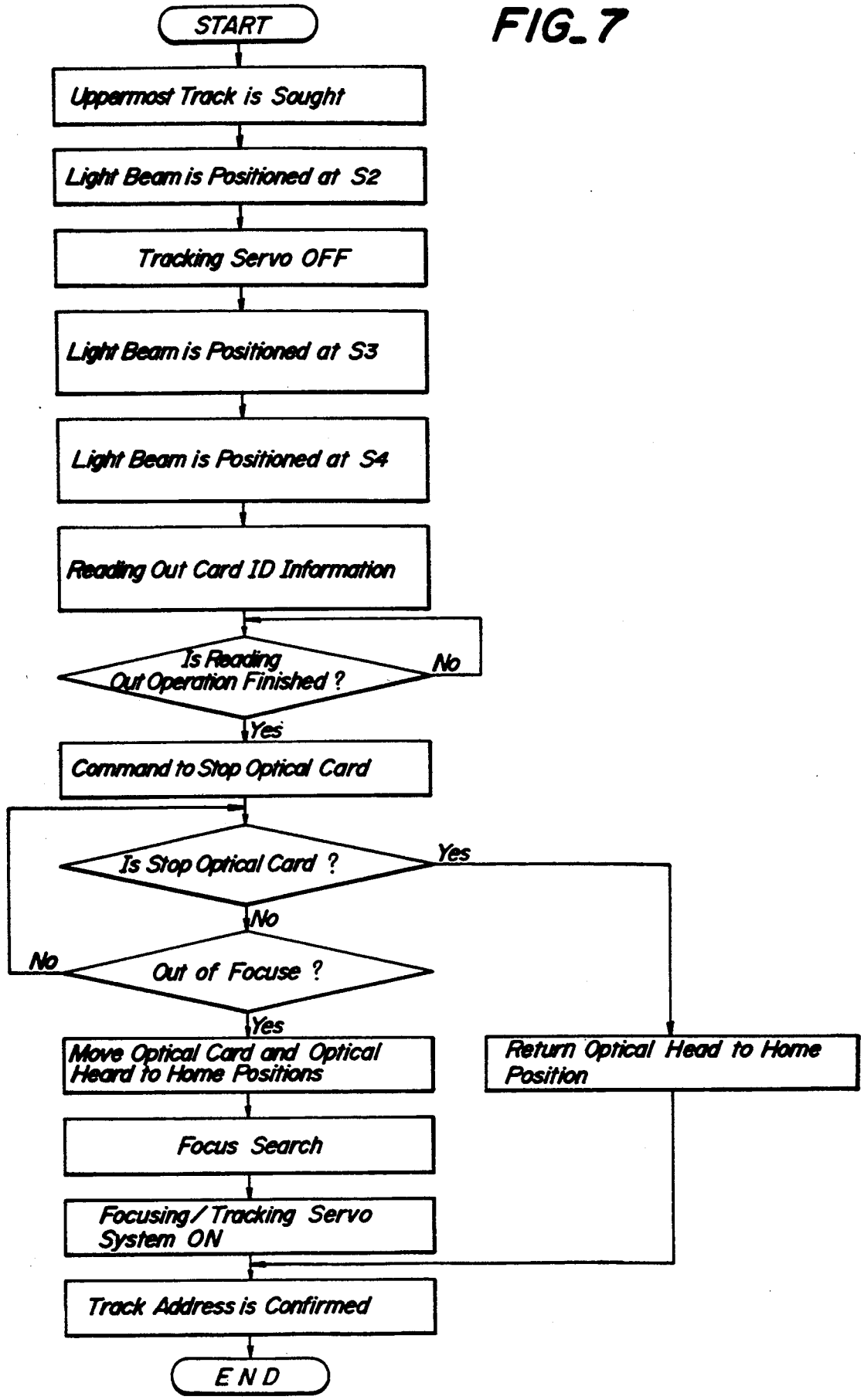
FIG. 7 is a flow chart representing an access movement when card ID information recording area is sought.

Next, the access movement of the light beam for card ID portion 6 will be explained, referring to the flow chart shown in FIG. 7 and the locus depicted in FIG. 8. As explained in the above, the card ID portion 6 is preliminarily recorded on the outside of the track ID portion 4A and above the upper portion of the uppermost track of a plurality of tracks 2 formed on the optical card 1. In the card ID portion 6, there is formed no guide track for the tracking operation; and therefore it is not so easy to put the light beam thereon. Card identifying information data is recorded with the aid of bar codes having their width of about 0.5 mm, as shown in FIG. 9. It should be noted that in FIG. 9 the numerical reference 41 shows a portion where the reflectivity is low, and the numerical reference 42 a portion where the reflectivity is high; and these portions are corresponding to "0" and "1", respectively. In the card ID portion 6, since information data is read out without a tracking operation, the width of the card ID portion 6 is formed to be wide in order to prevent that the light beam spot is formed out of the card ID portion 6 even when the light beam is moved so as to deviate from the desired position in the tracking direction.

As well as the access movement of the light beam for the normal data portion 5, it is assumed that the optical card 1 is stopped, the optical beam spot is positioned at home position S1 in FIG. 8, and the track address of the home position S1 is known.

The optical beam spot is moved to the uppermost track 2a of the tracks 2 formed on the optical card 1 by coarse access or track jump. In case that the optical beam is positioned at the left side track ID portion 4A, the optical card 1 is moved in the rearward direction to the position S2 without reading/reproducing information. Next, the tracking servo system is made OFF; and a constant voltage is applied to the tracking actuator, by which the objective lens 21D provided in the optical pick up 21 is driven in the tracking direction, by the constant voltage circuit 33 to move the light beam spot upto the position above the uppermost track 2a. It should be noted that the voltage to be applied to the tracking actuator is about 250 $\mu$m, by which the light beam spot is moved to the substantially center portion of the card ID portion 6 in its width direction. In such manner, the light beam spot is moved to the position S3 in the card ID portion 6. Then, the optical card 1 is moved into the forward direction in order to move the light beam spot at the position S4, which is in the left side of the card ID portion 6. The position S4 is determined in a manner such that the relative speed of the optical card 1 with respect to the optical head 21 is increased to a speed at which information recorded on the card ID portion 6 is read out. That is to say, position S4 is determined to be separated from the left side edge of the card ID portion 6 about 2 to 3 mm. Then, the optical card 1 is moved in the rearward direction at a constant speed to read out card identifying information recorded on the card ID portion 6. After reading out card identifying information, the optical card 1 is stopped and the light beam spot of the optical head 21 is returned to the home position S2. Then, the tracking servo system is made ON, and the track address of the home position is confirmed. The operation for reading out card identifying information is finished in such manner.

Since there is only provided a space of about 2 to 3 mm between the right side edge of the card ID portion 6 and the right side edge of the optical card 1, if the moving speed of the optical card 1 is too fast, the light beam would be stopped at the outside of the optical card 1, and then the light beam would be out of focus. In such case, after the optical card 1 and the optical head 21 are returned to their home positions, respectively, the focus search operation is conducted; and then the focusing servo system and the tracking servo system are made ON and the track address of the home position is confirmed to finish the operation for reading out card identifying information.

The apparatus for recording/reproducing optical information on/from according to the invention is not limited to the above explained embodiment; and the apparatus can be applied upon many variations. For instance, in the embodiment mentioned in the above discussion, it is arranged such that the light beam is moved onto the card ID portion 6 by applying the constant voltage to the tracking actuator, after the uppermost one of the plurality of tracks formed on the optical card 1 is sought; however, the apparatus may be possible to be constructed such that the light beam spot is directly moved to the card ID portion 6 by only one coarse access operation of the optical head 21. Since the accuracy for determining the position of the light beam by the coarse access operation of the optical head 21 is about ±100 μm, it is possible to directly move the light beam spot to the card ID portion 6 by only one coarse access operation.

Further, the card ID portion 6 may be possible to be constructed such that the right side edge thereof is separated from the right edge side of the optical card 1; and the light beam is moved onto the right side of the card ID portion 6. In this case, the optical card 1 is moved in the forward direction to read out card identifying information from right to left, and thus the time period for the access operation for the card ID information can be made short.

As stated in detail above, the apparatus according to the invention is constructed such that information, which is recorded on the outside of the normal data recording area, for identifying an optical card per se can be reproduced with the aid of the apparatus for use in recording/reproducing information data on/from the normal data area of the optical card. Therefore, it is possible to reproduce card ID information data recorded on the card ID portion 6 without providing another apparatus for reading out card identifying information. Therefore, card identifying information can be reproduced without making the apparatus large and complex; and thus it is possible to save the cost which has been conventionally took for the apparatus for reproducing card identifying information.

What is claimed is:

1. An apparatus for recording and reproducing information data on and from an optical card including an information data recording area and a card identifying information recording area formed outside said information data recording area, comprising:

support means for receiving and supporting said optical card when said optical card is inserted in said apparatus;

optical means for emitting light beams to perform at least one of recording information data on and reproducing information data from said information data recording area of said optical card;

driving means for causing relative movement between said optical card and said light beams in a track direction; and controlling means for controlling said optical means and said driving means to cause said optical means to be in a position outside said information data recording area of said optical card to reproduce said card identifying information recorded on the card identifying information recording area when said optical card is supported on said support means, wherein said information data recording area comprises a plurality of information data recording tracks each including a guide means for light beams illuminated thereon and said card identifying information recording area includes no guide means for said light beams.

2. An optical card system, comprising:

an optical card including an information data recording area and a card identifying information recording area formed outside said information data recording area, wherein said information data recording area comprises a plurality of information data recording tracks each including a guide means for light beams illuminated thereon and said card identifying information recording area includes no guide means for said light means;

an apparatus for recording and reproducing information data on and from said optical card, comprising:

support means for receiving and supporting said optical card when said optical card is mounted in said apparatus;

optical means for emitting light beams to perform at least one of recording information data on and reproducing information data from said information data recording area of said optical card;

driving means for causing relative movement between said optical card and said light beams in a track direction; and controlling means for controlling said optical means and said driving means to cause said optical means to be in a position outside said information data recording area of said optical card to reproduce said card identifying information recorded on the card identifying information recording area when said optical card is supported on said support means.

* * * * *